(12) United States Patent
Boland et al.

(10) Patent No.: US 11,322,031 B2
(45) Date of Patent: May 3, 2022

(54) METHOD OF OPTIMIZED PATH PLANNING FOR UAVS FOR THE PURPOSE OF GROUND COVERAGE

(71) Applicant: International Business Machines Corporation, Armonk, NY (US)

(72) Inventors: Gregory F. Boland, Katonah, NY (US); Yu Ma, White Plains, NY (US); Justin G. Manweiler, Somers, NY (US); Kevin E. Siemonsen, New Fairfield, CT (US); Umut Topkara, Scarsdale, NY (US); Katherine Vogt, New York, NY (US); Justin Weisz, Stamford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 544 days.

(21) Appl. No.: 14/961,610

(22) Filed: Dec. 7, 2015

(65) Prior Publication Data
US 2017/0162060 A1    Jun. 8, 2017

(51) Int. Cl.
*G08G 5/00*    (2006.01)
*G06T 17/05*    (2011.01)
(Continued)

(52) U.S. Cl.
CPC ........... *G08G 5/0034* (2013.01); *G01C 21/20* (2013.01); *G05D 1/0005* (2013.01);
(Continued)

(58) Field of Classification Search
CPC . B64C 39/024; B64C 2201/123; B64D 47/08; G01C 21/02; G01C 21/20; G05D 1/0011; G05D 1/0094; G05D 1/101; G06Q 10/047; G06T 17/05; G08G 5/0034; G08G 5/0069; G08G 5/0086
See application file for complete search history.

(56) References Cited

U.S. PATENT DOCUMENTS 6,593,926 B1 *    7/2003   Yamaguchi ............. G06T 17/10
                                                              345/427
7,024,340 B2      4/2006   Nichols et al.
(Continued)

OTHER PUBLICATIONS

Nachmani, Minimum-energy flight paths for UAVs using mesoscale wind forecasts and approximate dynamic programming. Naval Postgraduate School Monterey CA, 2007.
(Continued)

*Primary Examiner* — Peter D Nolan
*Assistant Examiner* — Ce Li Li
(74) *Attorney, Agent, or Firm* — Daniel P. Morris; McGinn I.P. Law Group, PLLC.

(57) ABSTRACT

A method includes defining a two-dimensional geographic region by two-dimensional geographic coordinates to define the bounds of the region, converting each of the two-dimensional coordinates to three dimensional coordinates by way of a lookup stored in a computer readable medium, generating a three-dimensional grid of points, each spaced in an arrangement to encompass coverage of a predetermined ground area, and applying heuristics for a shortest path planning, relative to the three-dimensional grid of points.

20 Claims, 11 Drawing Sheets

(51) Int. Cl.
  *G05D 1/10* (2006.01)
  *B64D 47/08* (2006.01)
  *B64C 39/02* (2006.01)
  *G06Q 10/04* (2012.01)
  *G01C 21/20* (2006.01)
  *G05D 1/02* (2020.01)
  *G05D 1/00* (2006.01)

(52) U.S. Cl.
  CPC ......... *G05D 1/0202* (2013.01); *G06Q 10/047* (2013.01); *G08G 5/0069* (2013.01); *B64C 2201/123* (2013.01)

(56) References Cited

U.S. PATENT DOCUMENTS

| | | | |
|---|---|---|---|
| 7,970,532 B2 | 6/2011 | Tehan et al. | |
| 9,418,560 B1* | 8/2016 | Rosenwald | G08G 5/003 |
| 9,508,263 B1* | 11/2016 | Teng | B64C 39/024 |
| 2008/0262724 A1* | 10/2008 | Bodin | G05D 1/0094 |
| | | | 701/411 |
| 2009/0195358 A1* | 8/2009 | Vennelakanti | G06K 7/0008 |
| | | | 340/10.1 |
| 2010/0017114 A1* | 1/2010 | Tehan | G01C 21/00 |
| | | | 701/423 |
| 2012/0209459 A1* | 8/2012 | Klooster | G08G 5/0013 |
| | | | 701/18 |
| 2014/0192193 A1* | 7/2014 | Zufferey | G05D 1/0094 |
| | | | 348/144 |
| 2016/0202695 A1* | 7/2016 | Deroos | G05D 1/0011 |
| | | | 701/2 |
| 2017/0110014 A1* | 4/2017 | Teng | B64C 39/024 |

OTHER PUBLICATIONS

Hernandez-Lopez et al. "An Automatic Approach to UAV Flight Planning and Control for Photogrammetric Applications." Photogrammetric Engineering & Remote Sensing 79.1 (2013): 87-98.

Siebert et al., . "Mobile 3D mapping for surveying earthwork projects using an Unmanned Aerial Vehicle (UAV) system." Automation in Construction 41 (2014): 1-14.

Owen, "Characterisation of a UAV Electric Architecture and Power Demand Profile for the Purposes of Improving Overall System Efficiency and Performance". No. 2011-01-2682. SAE Technical Paper, 2011.

Dowling et al., "High Resolution DEMs from Unmanned Aerial Vehicles." 20th International Congress on Modelling and Simulation, Adelaide, Australia, Dec. 1-6, 2013.

* cited by examiner

1200

METHOD OF OPTIMIZED PATH PLANNING FOR UAVS FOR THE PURPOSE OF GROUND COVERAGE

BACKGROUND OF THE INVENTION

Field of the Invention

The disclosed invention relates generally to a technique of optimized path planning, and more particularly, but not by way of limitation, relating to a system, apparatus and method for optimized path planning for UAVs (unmanned aerial vehicles) for the purpose of ground coverage.

Description of the Related Art

UAVs (Unmanned Aerial Vehicles) or drones are emerging as de facto imaging method for many applications including defense, surveillance, asset management. Surveillance and reconnaissance tasks are currently often performed using an airborne platform such as a UAV. The airborne platform can carry different sensors. EO/IR cameras can be used to view a certain area from above. To support the task from the sensor analyst, different image processing techniques can be applied on the data, both in real-time or for forensic applications. Additionally, such UAV's can carry weapons and other cargo for delivery.

The UAVs can fly autonomously based on pre-programmed flight plans or more complex dynamic automation systems, or be remotely controlled manually over short or long distances.

However, powering such UAVs to perform tasks such as surveillance, delivery of weapons, and flight over long distances requires a great deal of power. Therefore, there is a need to conserve the energy required to perform all the functions of a UAV especially since space and weight of the UAV is at a premium.

Therefore, there is also a need for providing increased awareness of ground terrain, and energy costs of various flight operations of UAV.

SUMMARY OF INVENTION

In view of the foregoing and other problems, disadvantages, and drawbacks of the aforementioned background art, an exemplary aspect of the disclosed invention provides a system, apparatus, and method of providing optimized path planning for UAVs (unmanned aerial vehicles) for the purpose of ground coverage.

One example aspect of the disclosed invention provides a method including defining a two-dimensional geographic region by two-dimensional geographic coordinates to define the bounds of the region, converting each of the two-dimensional coordinates to three dimensional coordinates by way of a lookup stored in a computer readable medium, generating a three-dimensional grid of points, each spaced in an arrangement to encompass coverage of a predetermined ground area; and applying heuristics for a shortest path planning, relative to the three-dimensional grid of points.

The heuristics for a shortest path planning includes both distance and additional metrics including battery cost used to fuel an unmanned aerial vehicle (UAV). The additional metrics includes a vertical motion with respect to energy consumption, and wherein cost a function of the heuristics for the shortest path planning incorporates a cost of directional changes in a distance between points of the three-dimensional grid of points. The defining of the two-dimensional geographic region includes defining a sequence of the geographic coordinates of latitude and longitude to define bounds of the two-dimensional geographic region. The two-dimensional geographic coordinates comprising latitude and longitude coordinates, and wherein the three dimensional coordinates comprise latitude, longitude, and elevation by way of the lookup into a Geographic Information System (GIS).

The predetermined ground area includes an area to be photographed or other sensor readings needing coverage, and wherein a unmanned aerial vehicle (UAV) is controlled to visit each of the three-dimensional grid of points, if any point of the three-dimensional grid of points is constructed that falls outside the two-dimensional geographic region, such point of the three-dimensional grid of points is discarded from the generation of the three-dimensional grid of points.

The method further includes outputting a result of the heuristics for a shortest path planning, relative to the three-dimensional grid of points for control of an unmanned aerial vehicle (UAV). Defining the two-dimensional geographic region is further refined with a cost of environmental conditions including wind effects and/or refined with a cost of direction changes of a UAV, wherein the converting of each of the two-dimensional coordinates is further refined with a cost of environmental conditions including wind effects and/or refined with a cost of direction changes of the UAV, wherein the generating of the three-dimensional grid of points is further refined with a cost of environmental conditions including wind effects and/or refined with a cost of direction changes of the UAV, and wherein the applying heuristics for the shortest path planning, relative to the three-dimensional grid of points is further refined with a cost of environmental conditions including wind effects and/or refined with a cost of direction changes of the UAV.

In another example aspect of the disclosed invention, there is a control system for an unmanned aerial vehicle (UAV), including a memory, a processor coupled to the memory, the processor configured to perform a method including defining a two-dimensional geographic region by two-dimensional geographic coordinates to define the bounds of the region, converting each of the two-dimensional coordinates to three dimensional coordinates by way of a lookup stored in a computer readable medium, generating a three-dimensional grid of points, each spaced in an arrangement to encompass coverage of a predetermined ground area; and applying heuristics for a shortest path planning, relative to the three-dimensional grid of points.

The control system for the unmanned aerial vehicle (UAV) can be further refined with a cost of environmental conditions including wind effects and/or refined with a cost of direction changes of a UAV.

In yet another example aspect of the disclosed invention, there is a computer program product including a computer readable storage medium having program instructions embodied therewith, the program instructions readable and executable by a computer to cause the computer to, including a memory, a processor coupled to the memory, the processor configured to perform a method including defining a two-dimensional geographic region by two-dimensional geographic coordinates to define the bounds of the region, converting each of the two-dimensional coordinates to three dimensional coordinates by way of a lookup stored in a computer readable medium, generating a three-dimensional grid of points, each spaced in an arrangement to encompass coverage of a predetermined ground area; and applying heuristics for a shortest path planning, relative to the three-dimensional grid of points.

The computer program product can be further refined with a cost of environmental conditions including wind effects and/or refined with a cost of direction changes of a UAV.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

Figure 1:
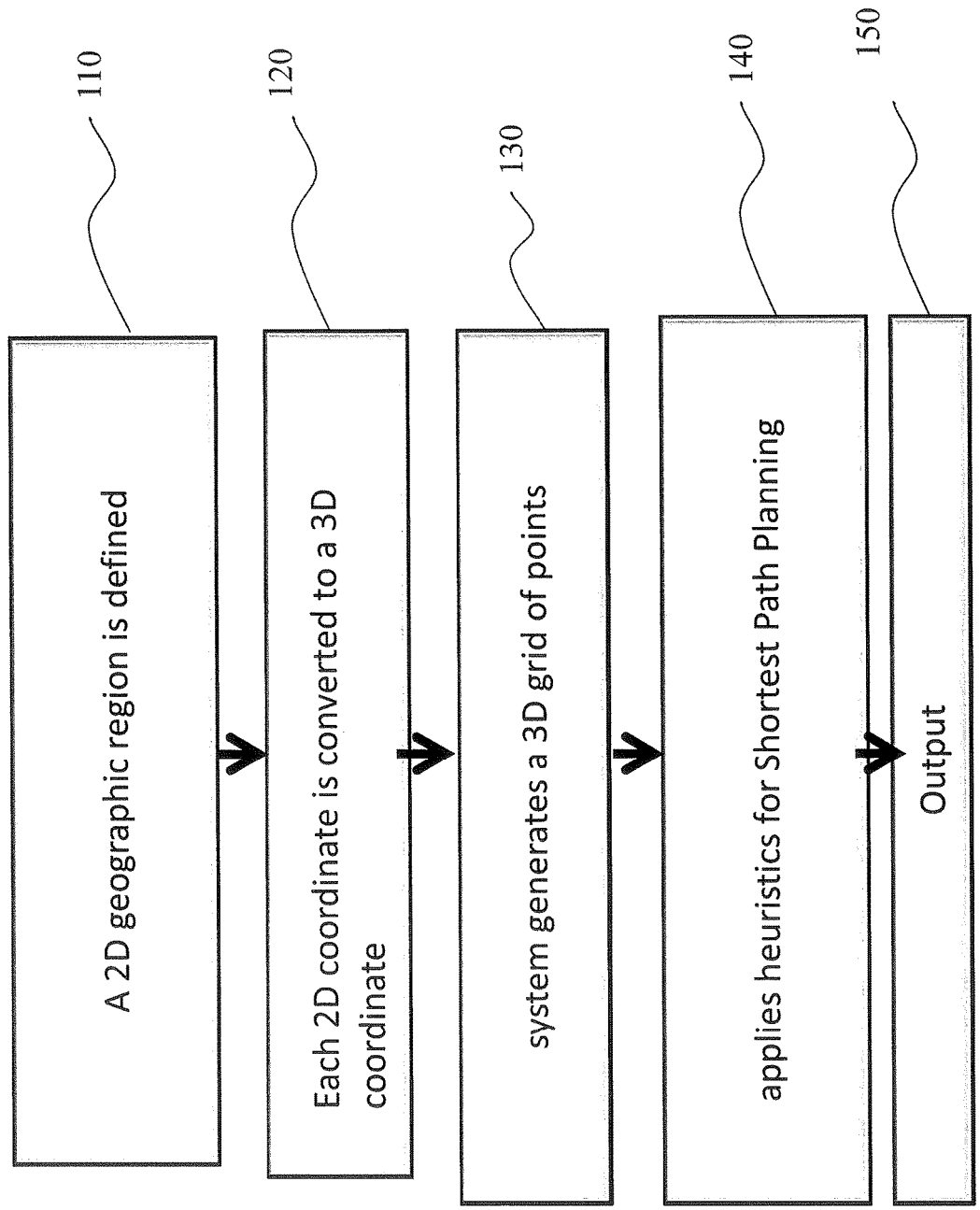
FIG. 1 illustrates a flow-chart for optimized path planning for UAVs in an example embodiment.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

A system is provided to incorporate awareness of ground terrain, energy costs of various flight operations (increase/decrease ground elevation, change in direction, etc.), and current weather/wind conditions to generate optimal or near-optimal flight plans with 100% ground coverage. One of the objects is to maximize battery life by creating flight plans that take advantage of the underlying terrain model, paying attention to the energy-cost functions for drone flight operations (including for example, ascend/descend, heading changes), and environmental conditions, such as current wind conditions.

For example, a flight plan over a hill is more efficient when the drone or UAV makes one trip up the hill and then descends the hill laterally to achieve full coverage, rather than making multiple trips up and down the hill to achieve coverage. Another example is to tailor the flight path to current wind conditions or other environmental conditions. For example, flying into or perpendicular to the direction of the prevailing wind is more efficient than flying against it.

One of the features of the present system is to reduce the area coverage problem to a coverage problem of several discrete points. This appears to be imprecise, heuristical approximation, but quite effective. A UAV reaching all of these several discrete points will have taken photographs that capture the entire area (it may be possible to cover the entire area without reaching those exact points, but reaching those points will guarantee coverage). Then the system can heuristically optimize the visitation order of all these points by mapping them to a Traveling Salesman problem (TSP). The Travelling Salesman Problem) is an algorithmic problem in the field of computer science focused on optimization. The system can find a heuristically optimized solution to a Traveling Salesman Problem on these points with point-to point "distances" calculated as a function of physical distance, change in elevation (from the terrain model), wind conditions, and available battery energy. The system can further refine to incorporate the cost of vehicular turns—in this case, the system can map the problem to the Clustered variant of the Traveling Salesman Problem. Again, this may be heuristically optimized.

One of the key features in the present technique is that the UAV area coverage problem is reduced to the form of a Traveling Salesman visitation problem on several discrete points inside the area.

Referring to FIG. 1, a 2D (two dimensional) geographic region is defined by the user or predetermined in a program (step 110). For example, the 2D geographic region can determined by a sequence of geographic coordinates (e.g., latitude and longitude) to define the bounds of the region.

Then, each 2D coordinate is converted to a 3D (three-dimensional) coordinate of latitude, longitude, elevation by way of a lookup into a Geographic Information System (GIS) (step 120). The lookup can be, for example, in the form a table stored in a computer readable medium.

Figure 2:
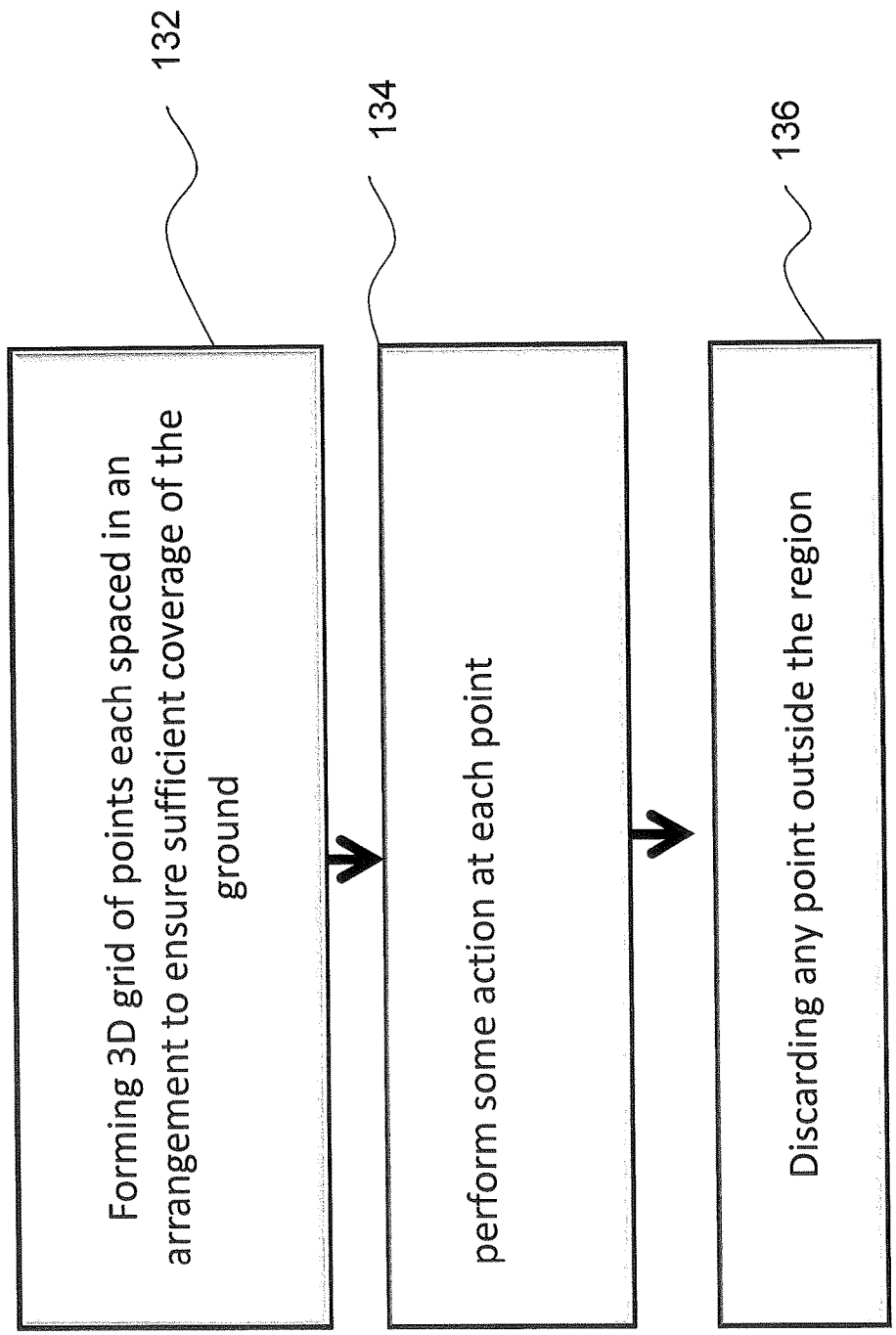
FIG. 2 illustrates a further detail for optimized path planning for UAVs in an example embodiment in FIG. 1.

The system then generates a 3D grid of points (step 130). Step 130 is detailed further in FIG. 2. The system generates the 3D grid of points, each spaced in an arrangement to ensure sufficient coverage of the ground (e.g., for photographs or other sensor readings), should a UAV visit each point (step 132), and optionally perform some action (pre-determined or other action that UAV of capable of) at each point (step 134). If any point is constructed that falls outside the region in step 110, it is discarded (step 136).

Figure 3:
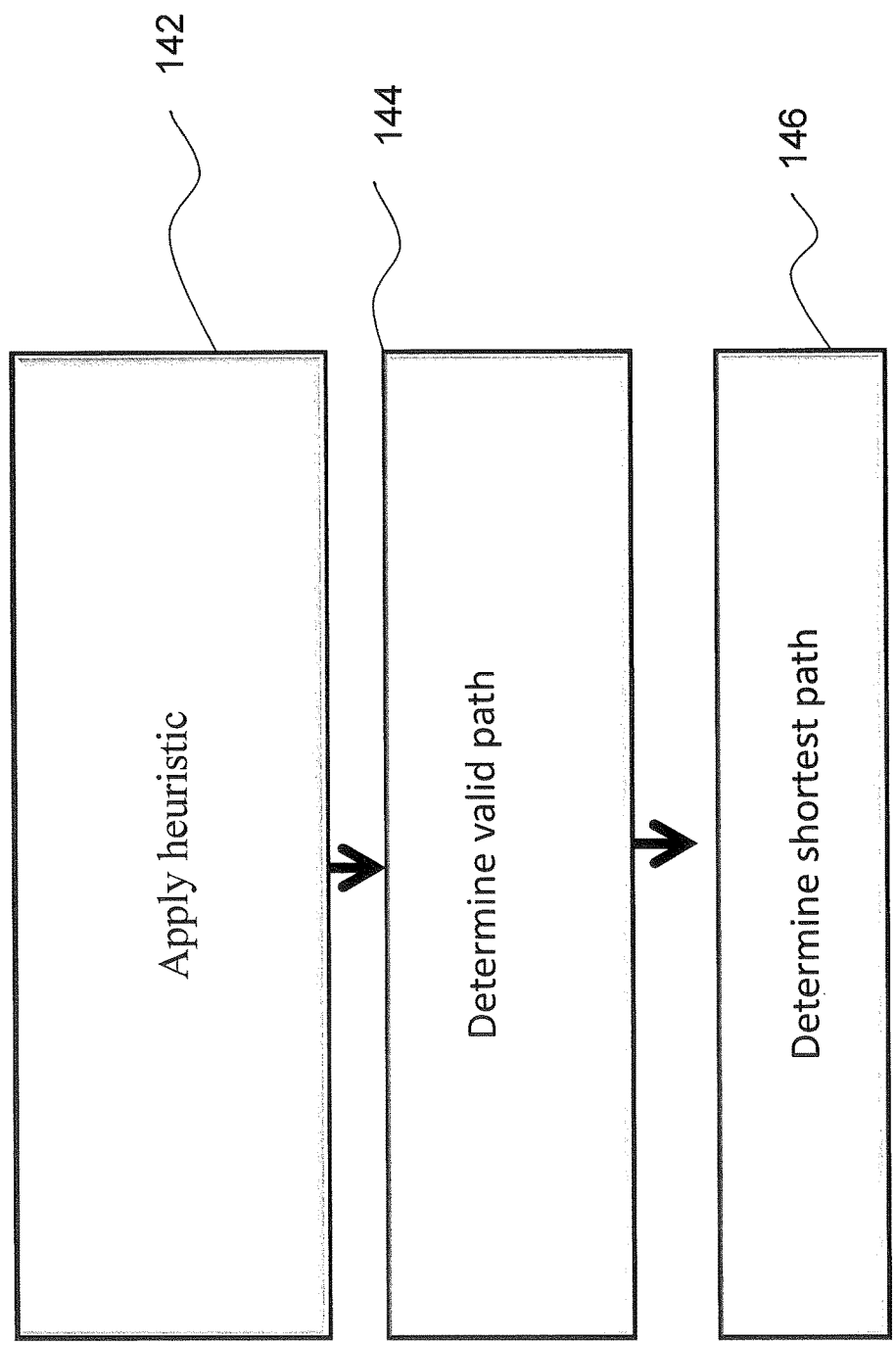
FIG. 3 illustrates a further detail for optimized path planning for UAVs in an example embodiment in FIG. 1.

Referring back to FIG. 1, the system applies heuristics for Shortest Path Planning, relative to the points (step 140). Referring to FIG. 3, step 140 is detailed further. Therefore, heuristics are applied relative to the points (step 142). Any path that visits each and every point (at least) once may be considered a "valid" path (step 144). However, only some paths will be labeled "optimal" according to a heuristic. The shortest path heuristic may be constructed variously (step 144), incorporating both distance and additional metrics, especially those emphasizing battery cost.

Additionally, the cost of other types of energy that is used by the UAV can also be taken into account, such as hydrogen fuel cells, jet fuel, or other type of fuel cells or energy storage unit.

For example, in most UAVs (drones), a vertical motion (upward altitude change) is more energy expensive than a lateral motion. Thus, each meter of distance vertically carries greater cost in the heuristic than each meter horizontally.

After applying the heuristics for shortest path (step 140), the result is outputted 150. The output can be provided for a control system of the UAV, such that the flight path generated is followed by the UAV. The output 150 can also be fed back to a remote display for review purposes of the flight path.

Figure 4:
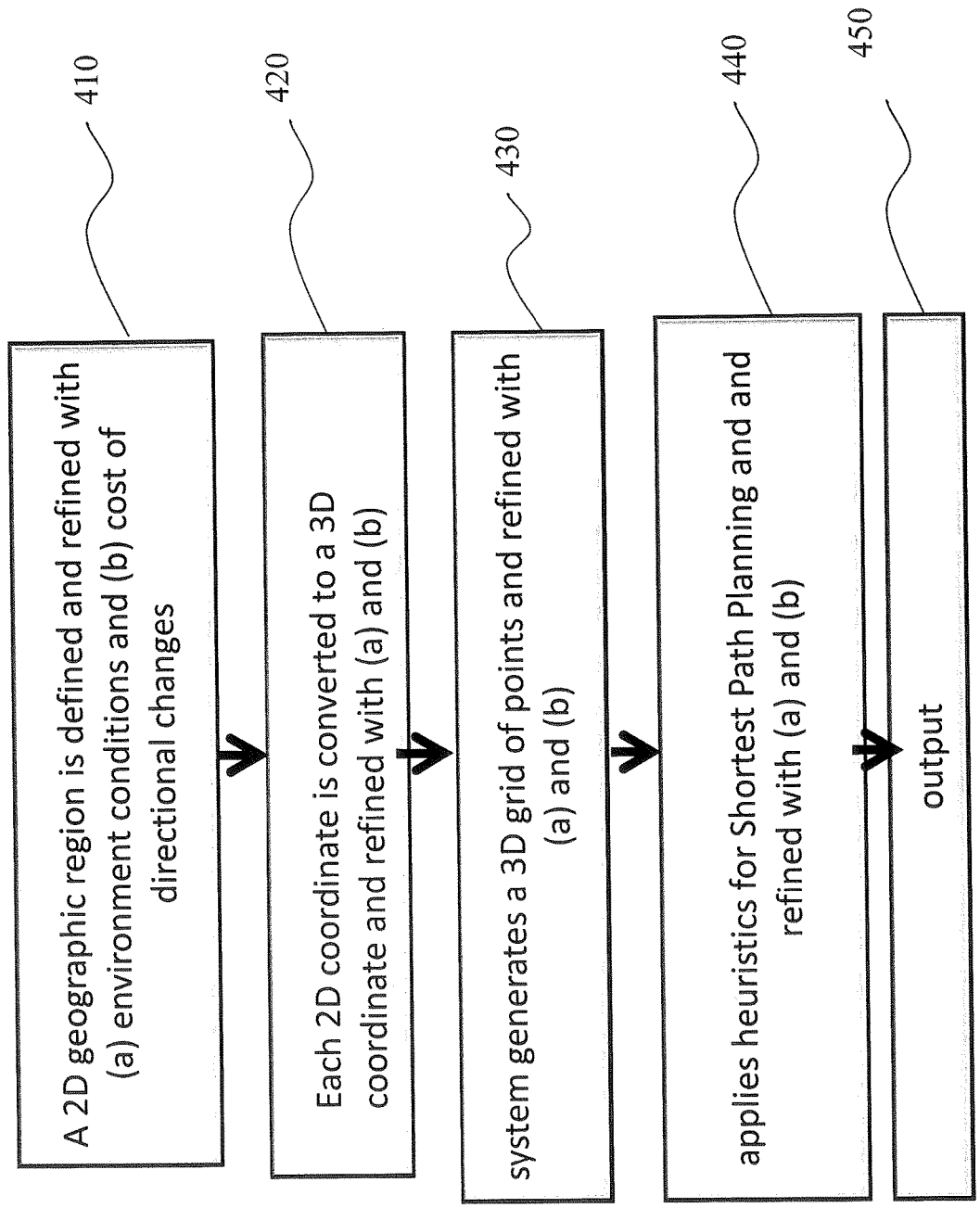
FIG. 4 illustrates a flow-chart for optimized path planning for UAVs in another example embodiment.

Referring to FIG. 4, the techniques of (steps 110, 120, 130 and 140) are further refined to incorporate the cost of environmental effects, such as wind effects (a). Given a detailed map of localized wind conditions (or just knowledge of the prevailing wind) the distance heuristic of step 140 (FIG. 1) is extended to reflect the energy and/or time impact of the wind condition or other environmental conditions. The resultant planned path is thus "wind aware". The time impact of the environmental conditions, can include, for example, the added or lost time in the flight depending on the environmental conditions including the wind.

The techniques of steps 110 through 140 can also be further refined to incorporate the cost of directional changes (b). For example, a UAV more efficiently continues in the same direction of motion rather than make a directional change. It is possible to model the effect of directional changes through additional points in the 3D grid (step 120). The cost function of (step 140) incorporates the cost of directional changes in the "distance" between points.

Referring to FIG. 4, the 2D (two dimensional) geographic region is defined by the user or predetermined in a program but refined further. The geographical region can be refined with the cost of wind effects (a) and/or the cost of direction changes (b) (step 410). For example, the 2D geographic region can determined by a sequence of geographic coordinates (e.g., latitude and longitude) to define the bounds of the region but modified further with the cost of wind effects (a) and/or the cost of direction changes (b).

Then, each 2D coordinate is converted to a 3D (three-dimensional) coordinate of latitude, longitude, elevation by way of a lookup into a Geographic Information System (GIS), but modified further with the cost of wind effects (a) and/or the cost of direction changes (b) (step 420). The lookup can be, for example, in the form a table stored in a computer readable medium.

Figure 5:
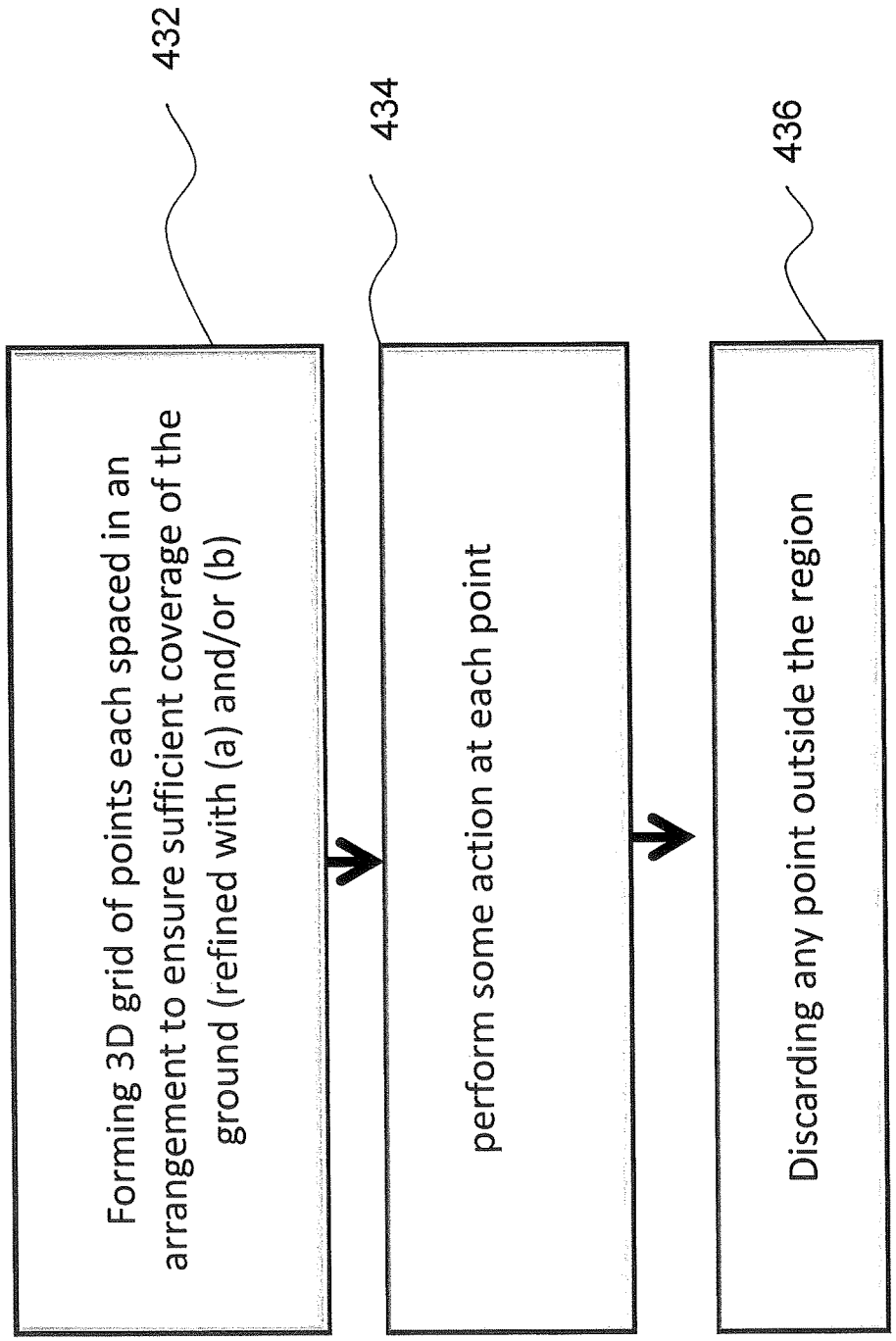
FIG. 5 illustrates a further detail for optimized path planning for UAVs in an example embodiment in FIG. 4.

The system then generates a 3D grid of points, but modified further with the cost of wind effects (a) and/or the cost of direction changes (b) (step 430). Step 430 is detailed further in FIG. 5. The system generates the 3D grid of points, each spaced in an arrangement to ensure sufficient coverage of the ground (e.g., for photographs or other sensor readings), should a UAV visit each point (step 432), and optionally perform some action (predetermined or other action that UAV of capable of) at each point (step 434). If any point is constructed that falls outside the region in step 110, it is discarded (step 436). The steps 432-436 are further refined with the cost of wind effects (a) and/or the cost of direction changes (b).

Figure 6:
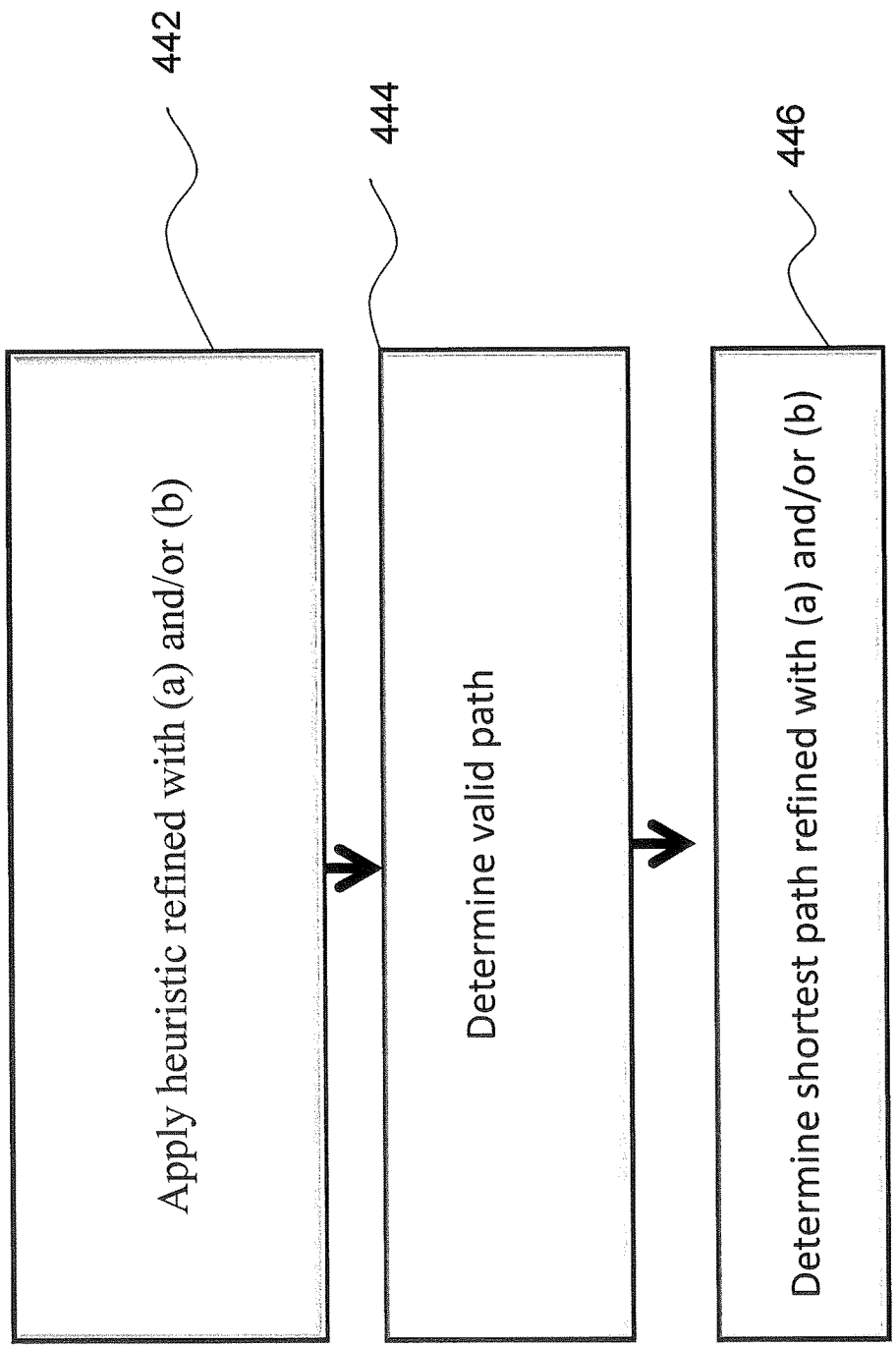
FIG. 6 illustrates a further detail for optimized path planning for UAVs in an example embodiment in FIG. 4.

Referring back to FIG. 4, the system applies heuristics for Shortest Path Planning, relative to the points (step 440). Referring to FIG. 6, step 440 is detailed further. Therefore, heuristics are applied relative to the points, but refined further with the cost of wind effects (a) and/or the cost of direction changes (b) (step 442). Any path that visits each and every point (at least) once may be considered a "valid" path (step 444). However, only some paths will be labeled "optimal" according to a heuristic. The shortest path heuristic may be constructed variously (step 444), incorporating both distance and additional metrics, especially those emphasizing battery cost.

Referring back to FIG. 4, after applying the heuristics for shortest path (step 440), the result is outputted 450. The output can be provided for a control system of the UAV, such that the flight path generated is followed by the UAV. The output 450 can also be fed back to a remote display for review purposes of the flight path.

The techniques of steps 410-450 can be refined with other variables that can affect the cost of flight of the UAV and not merely limited to environmental conditions and direction changes.

Exemplary Hardware and Cloud Implementation

Figure 7:
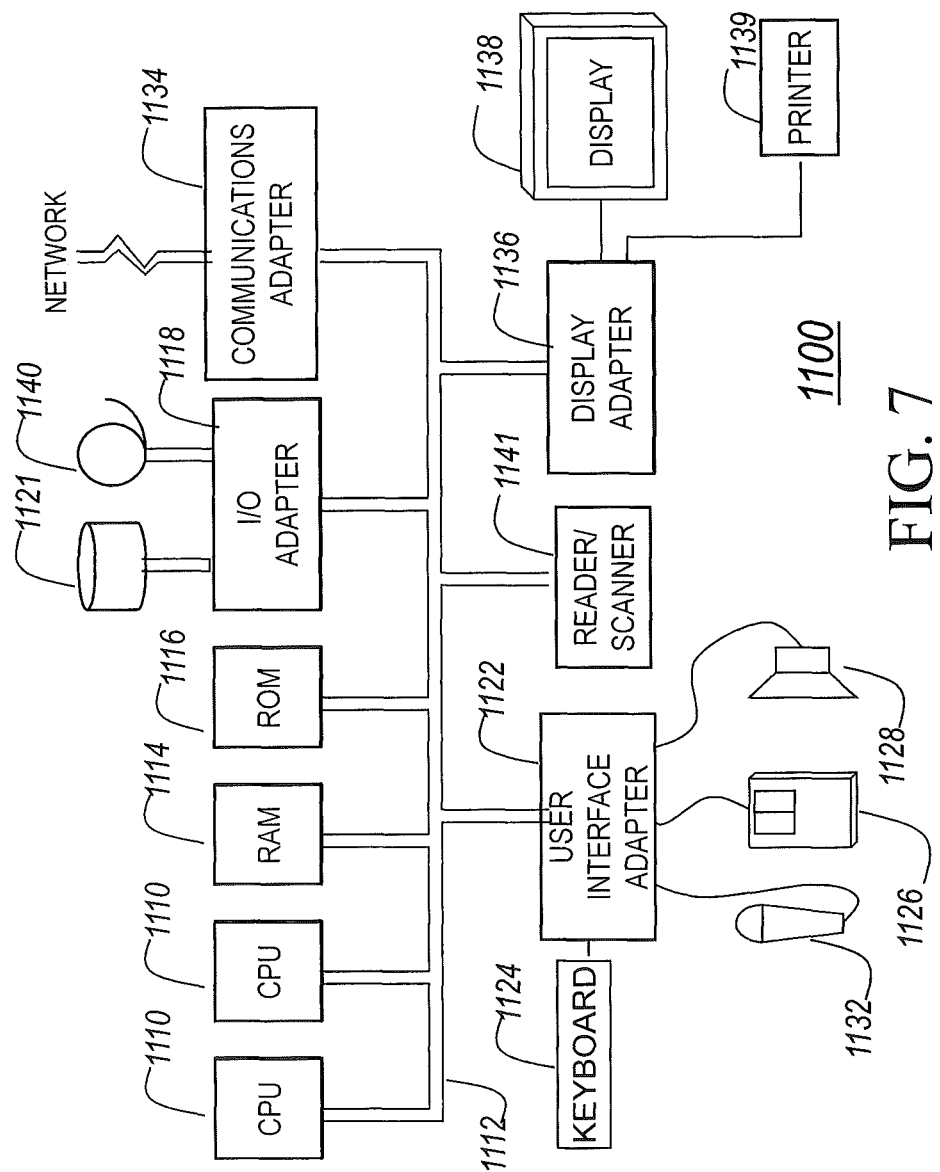
FIG. 7 illustrates an exemplary hardware/information handling system for incorporating the exemplary embodiment of the invention therein.

FIG. 7 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 8:
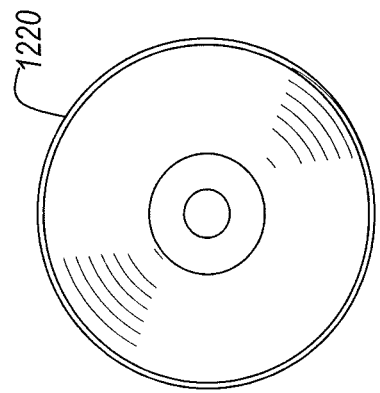
FIG. 8 illustrates a signal-bearing storage medium for storing machine-readable instructions of a program that implements the method according to the exemplary embodiment of the invention.
Figure 8:
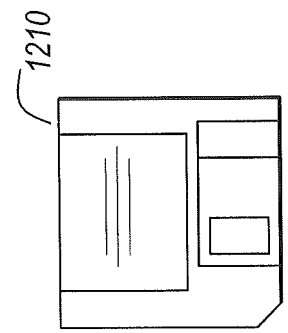

Alternatively, the instructions may be contained in another signal-bearing storage media 1200, such as a magnetic data storage diskette 1210 or optical storage diskette 1220 (FIG. 8), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
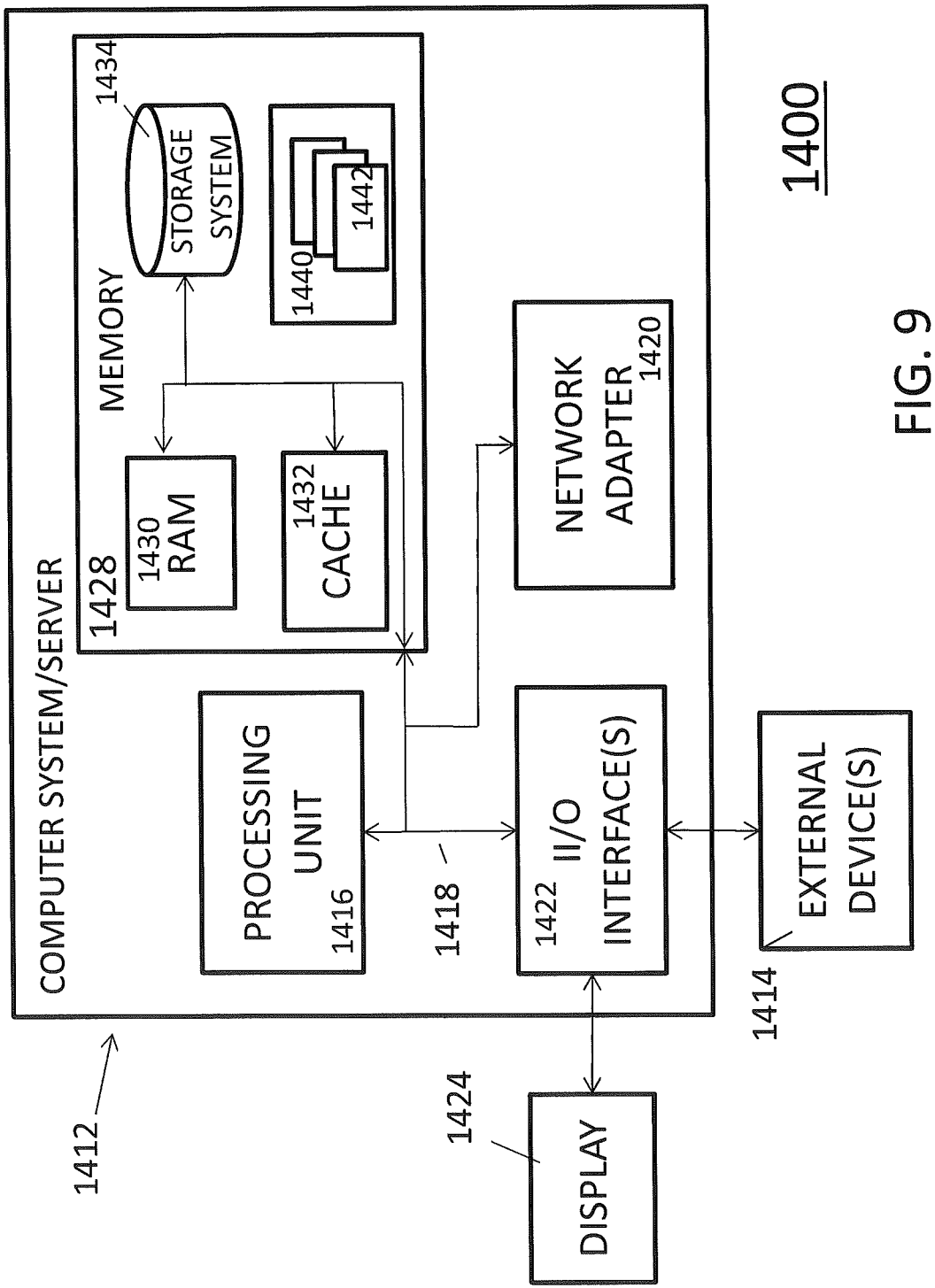
FIG. 9 depicts a cloud computing node according to an embodiment of the present invention.

Referring now to FIG. 9, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 10:
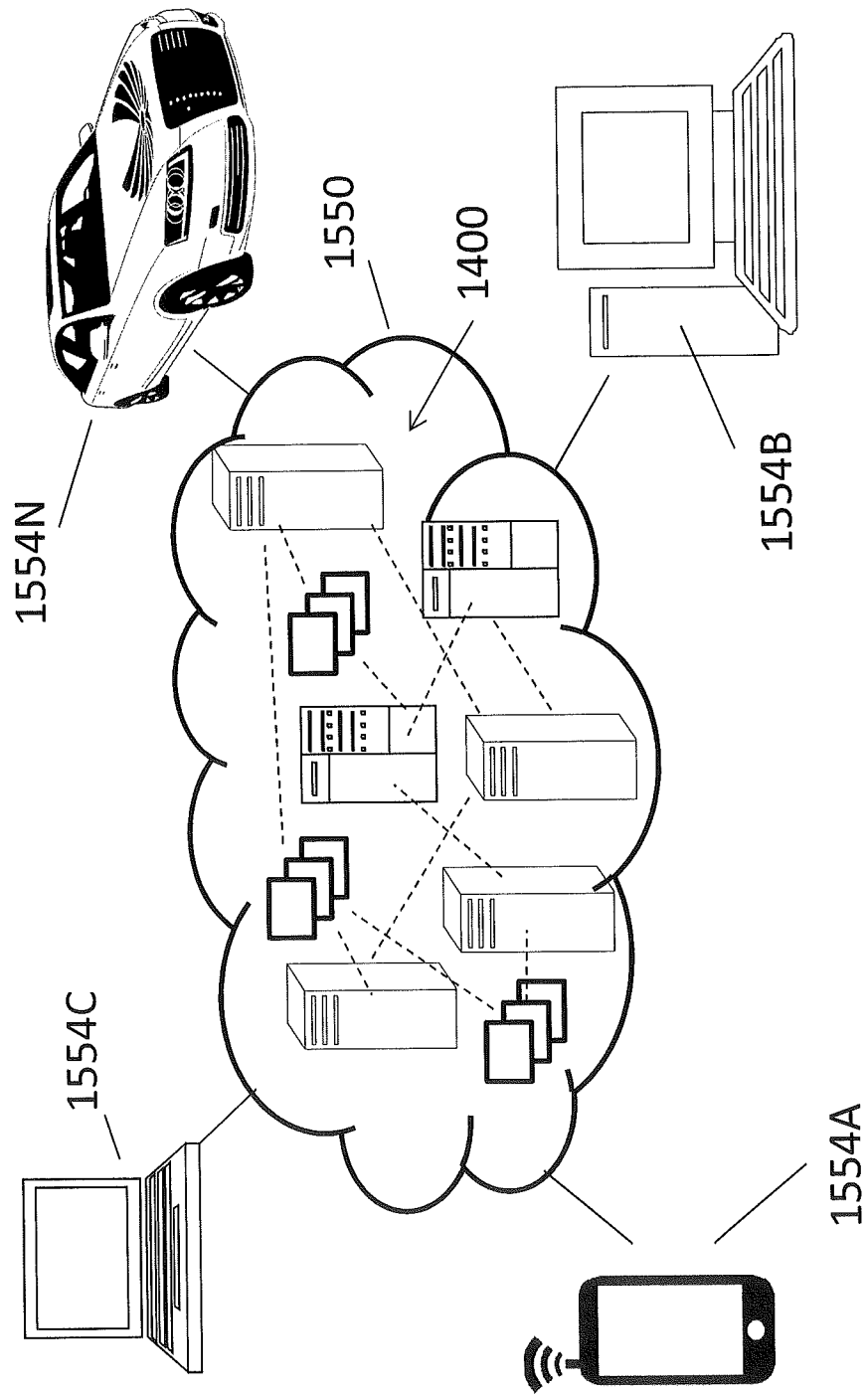
FIG. 10 depicts a cloud computing environment according to an embodiment of the present invention.

Referring now to FIG. 10, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 10 are intended to be illustrative only and that computing nodes 1400 and cloud computing environment 1550 can communicate with any type of computerized device over any type of network and/or network addressable connection (e.g., using a web browser).

Figure 11:
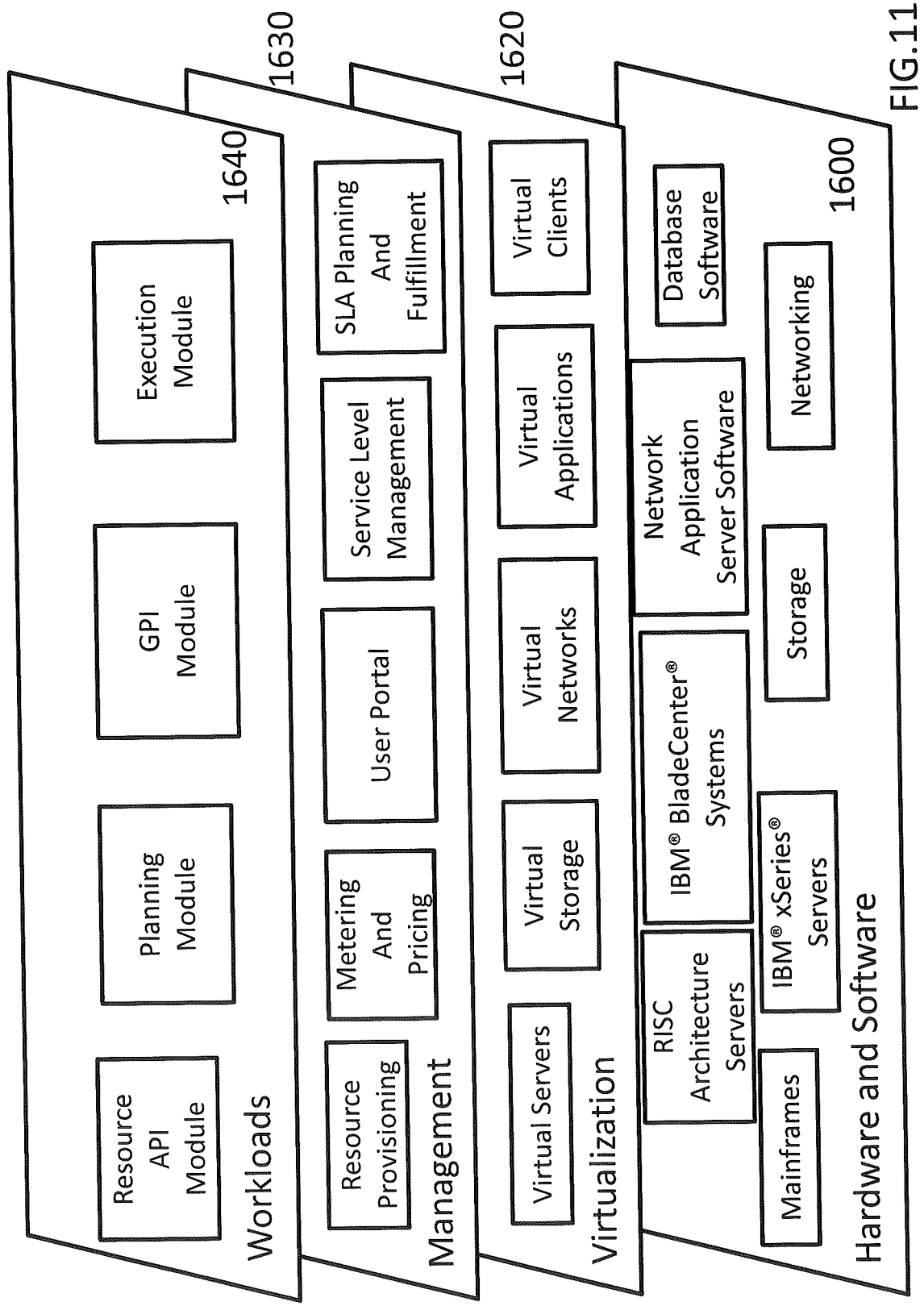
FIG. 11 depicts abstraction model layers according to an embodiment of the present invention.

Referring now to FIG. 11, a set of functional abstraction layers provided by cloud computing environment 1550 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the disclosed invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for transport of an unmanned aerial vehicle (UAV), comprising:
defining a two-dimensional geographic region by two-dimensional geographic coordinates to define the bounds of the region;
converting each of the two-dimensional coordinates to three dimensional coordinates by way of a lookup table stored in a computer readable medium to change the two-dimensional coordinates;
generating a three-dimensional grid of points, each spaced in an arrangement to encompass coverage of a predetermined ground area;
applying heuristics for a shortest path planning using a finite number of discrete points, relative to the three-dimensional grid of points to configure a route for the transport of the unmanned aerial vehicle (UAV); and
controlling the unmanned aerial vehicle based on the route,
wherein the converting of each of the two-dimensional coordinates to the three-dimensional coordinates is further refined dynamically with changing environmental conditions for output of the route.

2. The method according to claim 1,
wherein the applying of heuristics for the shortest path planning, relative to the three-dimensional grid of points is further refined with the changing environmental conditions to change direction of the UAV,
wherein the heuristics for a shortest path planning includes both distance and additional metrics including battery cost used to fuel the unmanned aerial vehicle (UAV),
wherein the two-dimensional coordinates is further refined with predefined conditions,
wherein the converting of each of the two-dimensional coordinates to the three-dimensional coordinates is further refined with the predefined conditions, and
wherein the applying of heuristics includes a heuristic approximation for the shortest path planning using the finite number of discrete points to reduce an area coverage problem to a problem of several discrete points,
further comprising controlling the unmanned aerial vehicle to visit each of the three-dimensional grid of points.

3. The method according to claim 1,
wherein the controlling the unmanned aerial vehicle is to visit the three-dimensional grid of points,
wherein the additional metrics includes a vertical motion with respect to energy consumption,
wherein cost a function of the heuristics for the shortest path planning incorporates a cost of directional changes in a distance between points of the three-dimensional grid of points, and
wherein the applying of heuristics includes a heuristic approximation for the shortest path planning using the finite number of discrete points to reduce an area coverage problem to a problem of several discrete points.

4. The method according to claim 1, wherein the defining of the two-dimensional geographic region includes defining a sequence of the geographic coordinates of latitude and longitude to define bounds of the two-dimensional geographic region, and wherein the applying of heuristics for the shortest path planning, relative to the three-dimensional grid of points is further refined with the changing environmental conditions to effect direction changes of the UAV.

5. The method according to claim 1, wherein the two-dimensional geographic coordinates comprising latitude and longitude coordinates, and
wherein the three dimensional coordinates comprise latitude, longitude, and elevation by way of the lookup into a Geographic Information System (GIS),
wherein the applying of heuristics for the shortest path planning, relative to the three-dimensional grid of points is further refined with the changing environmental conditions to change a flight path of the UAV.

6. The method according to claim 1, wherein the controlling the unmanned aerial vehicle is according to the heuristics applied,
wherein the predetermined ground area includes an area to be photographed or other sensor readings needing coverage, and
wherein the unmanned aerial vehicle (UAV) is controlled to visit each of the three-dimensional grid of points, if any point of the three-dimensional grid of points is constructed that falls outside the two-dimensional geographic region, such point of the three-dimensional grid of points is discarded from the generation of the three-dimensional grid of points.

7. The method according to claim 1, further comprising outputting a result of the heuristics for a shortest path planning, relative to the three-dimensional grid of points for control of the unmanned aerial vehicle (UAV),
wherein defining the two-dimensional geographic region is further refined with a cost condition.

8. The method according to claim 1, wherein defining the two-dimensional geographic region is further refined with a cost of environmental conditions including wind effects and/or refined with a cost of direction changes of the UAV,
wherein the converting of each of the two-dimensional coordinates is further refined with a cost of environmental conditions including wind effects and/or refined with a cost of direction changes of the UAV,
wherein the generating of the three-dimensional grid of points is further refined with a cost of environmental conditions including wind effects and/or refined with a cost of direction changes of the UAV,
wherein the applying heuristics for the shortest path planning, relative to the three-dimensional grid of points is further refined with a cost of environmental conditions including wind effects and/or refined with a cost of direction changes of the UAV, and
wherein applying heuristics for a shortest path planning within the UAV.

9. A control system for an unmanned aerial vehicle (UAV), comprising:
a memory;
a processor coupled to the memory,
the processor configured to perform a method comprising:
defining a two-dimensional geographic region by two-dimensional geographic coordinates to define the bounds of the region;
converting each of the two-dimensional coordinates to three dimensional coordinates by way of a lookup stored in a computer readable medium to change the two-dimensional coordinates;
generating a three-dimensional grid of points, each spaced in an arrangement to encompass coverage of a predetermined ground area;
applying heuristics for a shortest path planning using a finite number of discrete points, relative to the three-dimensional grid of points to configure a route; and
controlling the UAV based on the route.

10. The control system according to claim 9, wherein defining the two-dimensional geographic region is further refined with a cost of environmental conditions including wind effects and/or refined with a cost of direction changes of a UAV,
wherein the applying of heuristics includes a heuristic approximation for the shortest path planning using the finite number of discrete points to reduce an area coverage problem to a problem of several discrete points,
wherein the converting of each of the two-dimensional coordinates to the three-dimensional coordinates is further refined dynamically with changing environmental conditions, and
wherein the applying of heuristics for the shortest path planning, relative to the three-dimensional grid of points is further refined with the changing environmental conditions to effect direction changes of the UAV,
further comprising controlling the unmanned aerial vehicle to visit each of the three-dimensional grid of points.

11. The control system according to claim 9, wherein the converting of each of the two-dimensional coordinates is further refined with a cost of environmental conditions including wind effects and/or refined with a cost of direction changes of a UAV,
further comprising controlling the unmanned aerial vehicle to visit the three-dimensional grid of points.

12. The control system according to claim 9, wherein the generating of the three-dimensional grid of points is further refined with a cost of environmental conditions including wind effects and/or refined with a cost of direction changes of a UAV.

13. The control system according to claim 9, wherein the applying heuristics for the shortest path planning, relative to the three-dimensional grid of points is further refined with a cost of environmental conditions including wind effects and/or refined with a cost of direction changes of a UAV.

14. The control system according to claim 9, wherein the heuristics for a shortest path planning includes both distance and additional metrics including battery cost used to fuel an unmanned aerial vehicle (UAV),
wherein the additional metrics includes a vertical motion with respect to energy consumption, and
wherein cost a function of the heuristics for the shortest path planning incorporates a cost of directional changes in a distance between points of the three-dimensional grid of points.

15. The control system according to claim 9, wherein the defining of the two-dimensional geographic region includes defining a sequence of the geographic coordinates of latitude and longitude to define bounds of the two-dimensional geographic region,
wherein the two-dimensional geographic coordinates comprising latitude and longitude coordinates, and
wherein the three dimensional coordinates comprise latitude, longitude, and elevation by way of the lookup into a Geographic Information System (GIS).

16. The control system according to claim 9, wherein the predetermined ground area includes an area to be photographed or other sensor readings needing coverage, and
wherein a unmanned aerial vehicle (UAV) is controlled to visit each of the three-dimensional grid of points, if any point of the three-dimensional grid of points is constructed that falls outside the two-dimensional geographic region, such point of the three-dimensional grid of points is discarded from the generation of the three-dimensional grid of points.

17. A computer program product comprising a computer readable storage medium having program instructions embodied therewith, the program instructions readable and executable by a computer to cause the computer to perform a method, comprising:
 a memory;
 a processor coupled to the memory,
 the processor configured to perform the method comprising:
 defining a two-dimensional geographic region by two-dimensional geographic coordinates to define the bounds of the region;
 converting each of the two-dimensional coordinates to three dimensional coordinates by way of a lookup stored in a computer readable medium to change the two-dimensional coordinates;
 generating a three-dimensional grid of points, each spaced in an arrangement to encompass coverage of a predetermined ground area;
 applying heuristics for a shortest path planning using a finite number of discrete points, relative to the three-dimensional grid of points to configure a route for transport of an unmanned aerial vehicle (UAV); and
 controlling the UAV based on the route.

18. The computer program product according to claim 17, wherein defining the two-dimensional geographic region is further refined with a cost of environmental conditions including wind effects and/or refined with a cost of direction changes of the UAV, and
 wherein the applying of heuristics includes a heuristic approximation for the shortest path planning using the finite number of discrete points to reduce an area coverage problem to a problem of several discrete points,
 further comprising controlling the unmanned aerial vehicle to visit each of the three-dimensional grid of points,
 wherein the converting of each of the two-dimensional coordinates to the three-dimensional coordinates is further refined dynamically with changing environmental conditions.

19. The computer program product according to claim 17, wherein the converting of each of the two-dimensional coordinates is further refined with a cost of environmental conditions including wind effects and/or refined with a cost of direction changes of the UAV, and
 wherein the converting of each of the two-dimensional coordinates to the three-dimensional coordinates is further refined dynamically with changing environmental conditions, and
 wherein the applying of heuristics for the shortest path planning, relative to the three-dimensional grid of points is further refined with the changing environmental conditions to effect direction changes of the UAV.

20. The computer program product according to claim 17, wherein the generating of the three-dimensional grid of points is further refined with a cost of environmental conditions including wind effects and/or refined with a cost of direction changes of the UAV, and
 wherein the applying heuristics for the shortest path planning, relative to the three-dimensional grid of points is further refined with a cost of environmental conditions including wind effects and/or refined with a cost of direction changes of the UAV.

* * * * *